May 11, 1926.
H. M. PFLAGER
1,584,134
CAR TRUCK AND METHOD OF ASSEMBLING THE SAME
Filed June 7, 1924
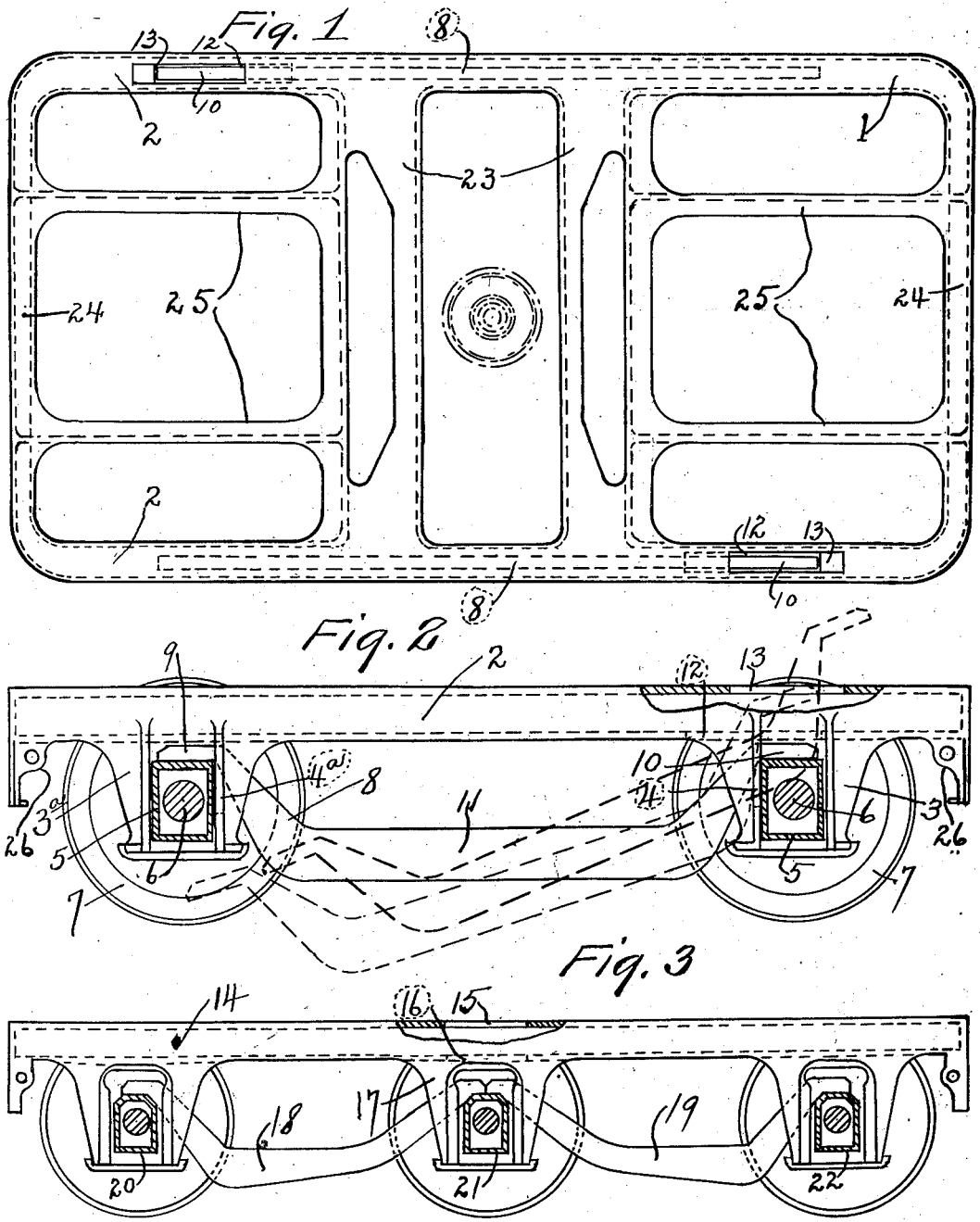
Inventor
Harry M. Pflager
By Cornwall, Bedell + Jaures Attys.

Patented May 11, 1926.

1,584,134

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK AND METHOD OF ASSEMBLING THE SAME.

Application filed June 7, 1924. Serial No. 718,517.

My invention relates to an improvement in railway car trucks of either four or six wheel type and more particularly to car trucks having depressed equalizers in the same vertical plane as the wheel pieces of the truck frame.

The object of my invention is to provide a car truck of the type described with pedestals cast integral with the wheel pieces or fixed thereon and adapted to utilize a one-piece depressed equalizer.

In my copending applications Serial No. 718,516 and No. 718,518, filed of even date herewith I describe other structures in which this object is attained by a particular pedestal construction and by a certain wheel piece construction. In my present invention the object is attained by a different particular wheel piece construction described below and illustrated in the drawings, in which—

Figure 1 is a top view of a four wheel truck frame showing my present invention.

Figure 2 is a side elevation of the same.

Figure 3 is a side elevation of a six wheel truck embodying my invention.

The numeral 1 in the drawings indicates a truck frame having wheel pieces 2, transoms 23, end transoms 24, transom and end transom connecting rails 25, and brake hanger lugs 26. Integrally cast with said wheel pieces are pedestals 3 and 3ᵃ. In the case of a four wheel truck the side of each pedestal toward the center of the truck is slotted as indicated by the numerals 4 and 4ᵃ to permit the insertion and limited vertical movement of an equalizer bar. Mounted in said pedestals are journal boxes 5. Axles 6 having wheels 7 fixed thereon are mounted in the journal boxes. An equalizer bar 8 has ends 9 and 10 each of which rests on top of a respective journal box 5. The central portion 11 of equalizer bar 8 is depressed so that the upper edge of portion 11 is substantially lower than the ends 9 and 10. In the lower surface of the wheel piece 2 is an opening 12 positioned over one of the pedestals 3. 13 is an opening in the upper surface of wheel piece 2, being somewhat smaller and staggered in relation to opening 12. The purpose of these openings 12 and 13 is hereinafter explained.

Heretofore in the assembly of a car truck having pedestals bolted or riveted to the wheel pieces, it was necessary to insert the ends of the equalizer bar into the slotted pedestals before fastening the pedestals to the wheel pieces. In the case of a car truck having pedestals cast integral with the wheel pieces, the above process could not be followed. This type of truck required the use of straight equalizer bars or divided equalizer bars positioned inside and outside respectively of the pedestal. With my improved construction, the equalizer bar may be assembled with a car truck having pedestals cast integral with their wheel pieces or fixed thereon by passing the end 10 of equalizer bar 8 through slot 4 in pedestal 3 and through openings 12 and 13 in wheel piece 2 as shown by dotted lines in Figure 2 of the drawing. The end 9 of the equalizer bar is then swung upwardly until it is above the lower edge of slot 4ᵃ in pedestal 3ᵃ. The end 10 is then lowered and the equalizer bar 8 shifted longitudinally into position.

Figure 3 shows the adaptation of my invention to a six wheel truck. The wheel piece 14 has openings 15 and 16 in its upper and lower surfaces, respectively. These openings are immediately over the central one of the pedestals indicated by numeral 17. Depressed one-piece equalizer bars 18 and 19 rest on journal boxes 20, 21, and 22.

The design of the equalizer bars 18 and 19 as are customarily used in six wheel trucks is such that the opening 16 may be of approximately the same size as opening 15 or on occasion slightly smaller.

The method of inserting the equalizer bars is the same for the six wheel truck as for the four wheel truck. An end of each equalizer bar 18 and 19 is passed through openings 16 and 15. The opposite ends are swung up to the necessary height and the bars are then moved into position.

Obviously, the openings in the wheel piece could be over the end pedestals only or over each pedestal if desired, and variations in the size of the openings and their relative positions may be made without departing from the spirit of my invention as claimed.

I claim:

1. In a car truck, a wheel piece having upper and lower walls, a pedestal on said wheel piece, said wheel piece having openings in its upper and lower walls over one of said pedestals for the introduction of one-piece depressed equalizer bars.

2. In a car truck, a wheel piece, and pedestals integral therewith, said wheel piece having openings over one of said pedestals for the introduction of one-piece depressed equalizer bars.

3. In a car truck, a wheel piece, a pedestal thereon, said wheel piece and pedestal each being adapted to permit an end of a depressed equalizer bar to be passed through them to permit assembly or removal of the equalizer bar with or from the wheel piece and pedestal.

4. In a car truck, a wheel piece, pedestals carried thereby, said wheel piece being imperforate over one of said pedestals and provided with a passage over another of said pedestals adapted to permit the passage of the end of a one-piece depressed equalizer through said wheel piece.

5. In a six wheel car truck, a wheel piece, pedestals carried thereby, and depressed equalizer bars, said wheel piece having vertical openings permitting the passage therethrough of the ends of one or more of said equalizer bars to permit assembly or removal of said equalizer bars with or from the other truck elements.

6. In a six wheel car truck, a wheel piece, pedestals carried thereby, and equalizer bars, said wheel piece having a vertical passage over the central pedestal adapted to permit the passage through the wheel piece of the inner ends of said equalizer bars.

7. A car truck comprising a wheel piece, pedestals on said wheel piece, openings in said wheel piece, journal boxes, and a depressed one-piece equalizer bar adapted to be introduced through said openings in order to place its ends on said journal boxes.

8. In a car truck, an integral truck frame including a wheel piece, pedestals on said wheel piece, equalizer bars, said wheel piece having openings adapted to receive an end of each of said equalizer bars.

9. In combination, a truck frame having wheel pieces and a transom, pedestals on said wheel pieces, and one-piece depressed equalizer bars, said wheel pieces having openings adapted to receive an end of each of said equalizer bars.

10. In combination, a truck frame having wheel pieces and end transoms, pedestals on said wheel pieces, and one-piece depressed equalizer bars, said wheel pieces having openings adapted to receive an end of each of said equalizer bars.

11. In combination, a truck frame having transoms, end transoms, and wheel pieces, pedestals on said wheel pieces, and one-piece depressed equalizer bars, said wheel pieces having openings adapted to receive an end of said equalizer bars.

12. The method of introducing an equalizer bar into operable position on a car truck characterized by passing one end of said equalizer bar through a slot in one pedestal, a slot in the lower face of the wheel piece, and a slot in the upper face of the wheel piece, and swinging the opposite end of said equalizer bar upwardly and into position.

13. The method of introducing an equalizer bar into operable position on a car truck characterized by passing one end of said equalizer bar through a slot in the lower face of the wheel piece and a slot in the upper face of the wheel piece, swinging the opposite end of said equalizer bar upwardly and into position.

14. The method of introducing an equalizer bar into operable position on a car truck characterized by passing one end of said equalizer bar through the wheel piece between the front and rear faces of the same and swinging the opposite end of said equalizer bar upwardly and into position.

15. The method of introducing a depressed one piece equalizer bar into operable position on a car truck which is characterized by passing one end of said equalizer bar through a slot in the lower face of the wheel piece, a slot in the upper face of the wheel piece, swinging the opposite end of said equalizer bar upwardly and through the slotted ends of the adjacent pedestal into position.

16. In combination, a truck frame having wheel pieces, brake hanger lugs on said wheel pieces, and one-piece depressed equalizer bars, said wheel pieces having openings adapted to receive an end of each of said equalizer bars.

17. In combination, an integral truck frame including wheel pieces, end transoms, a transom, and transom end transom connecting rails, one-piece depressed equalizer bars and pedestals carried by said wheel pieces, said wheel pieces being provided with openings adapted to receive the ends of said equalizer bars.

18. The method of assembling an equalizing bar with a car truck wheel piece and pedestals, which is characterized by passing one end of the bar through one side of one pedestal and through the wheel piece and swinging the other end of the equalizing bar upwardly into position.

In testimony whereof I hereunto affix my signature this 28th day of May, 1924.

H. M. PFLAGER.